United States Patent [19]
Harrison et al.

[11] Patent Number: 5,644,865
[45] Date of Patent: Jul. 8, 1997

[54] FISH HOOK REMOVER

[75] Inventors: Michael A. Harrison; Mark S. Farris, both of Ketchum, Id.

[73] Assignee: C-1 Design Group L.L.C., Ketchum, Id.

[21] Appl. No.: 430,871

[22] Filed: Apr. 28, 1995

[51] Int. Cl.⁶ ................................................. A01K 97/00
[52] U.S. Cl. ...................................................... 43/53.5
[58] Field of Search ............................................. 43/53.5

[56] References Cited

U.S. PATENT DOCUMENTS

| | | |
|---|---|---|
| 2,333,695 | 11/1943 | Blackstone ............... 43/53.5 |
| 2,503,420 | 4/1950 | Shamel ..................... 43/53.5 |
| 2,533,152 | 12/1950 | Svenson ................... 43/53.5 |
| 2,561,281 | 7/1951 | Lawrence ................. 43/53.5 |
| 2,695,471 | 11/1954 | Imgerti . |
| 2,828,574 | 4/1958 | Metzger ................... 43/53.5 |
| 2,836,003 | 5/1958 | Shumacker .............. 43/53.5 |
| 2,984,931 | 5/1961 | Shaw ........................ 43/53.5 |
| 3,019,547 | 2/1962 | Felts ......................... 43/53.5 |
| 3,034,252 | 5/1962 | Basinski .................. 43/53.5 |
| 3,377,735 | 4/1968 | Daughtry . |
| 3,397,479 | 8/1968 | Tyjewski ................. 43/53.5 |
| 4,014,131 | 3/1977 | Bendik . |
| 4,028,825 | 6/1977 | Tetzner . |
| 4,206,561 | 6/1980 | Wong et al. . |

Primary Examiner—Kurt Rowan
Attorney, Agent, or Firm—Lyon & Lyon LLP

[57] ABSTRACT

A fish hook remover, designed to minimize damage to an artificial fly and to minimize human contact with a fish during fish hook removal, comprises an elongated body having a removal tip integral to a first end of the elongated body, and a handle attached to a second end of the elongated body. The removal tip comprises a guide region and a tubular head. The tubular head defines a slot on its surface and a chamber on its interior, and is positioned relative to the elongated body such that an axis defined by the chamber of the tubular head is offset by more than zero degrees but less than ninety degrees from an axis defined by the elongated body. The removal tip is designed to allow a user to easily slide a fishing line, which is tensioned by the weight of a caught fish, into the tubular head chamber via the slot. The removal tip is then slid down the fishing line, using the fishing line as a guide for the tubular head, to securely engage a fly in the chamber of the tubular head, thereby minimizing damage to the fly. The fish hook is extracted and removed from the fish by thrusting or pushing the fish hook remover downward such that the fish hook point is extracted from the fish. Once the hook is disengaged from the fish, the user twists the fish hook remover so that the fish hook will not re-hook the fish as the fish is released.

13 Claims, 3 Drawing Sheets

FISH HOOK REMOVER

FIELD OF THE INVENTION

This invention relates to fishing, and more specifically to a fish hook remover for removing a fish hook dressed as an artificial fly from the mouth of a fish without damaging the fly and without having to handle the fish to remove the fish hook.

BACKGROUND OF THE INVENTION

Fly fishing is a popular and rapidly growing sport. In this sport, an artificial fly is used as bait. The artificial fly typically comprises a fish hook fabricated with fur, feathers, or the like, in order to resemble an insect, or other forage, preferred by fish. The artificial fly is manipulated in the water to lure and hook the fish.

Once a fish is caught and reeled in, a fisherman removes the fish hook either by hand or with an implement such as forceps, small pliers or the like. At this point, the fisherman may keep the fish or, as is becoming more common, release the fish back into the water. Many waters are regulated so that fish are required to be released. As flyfishing gains in popularity, increasing numbers of lakes and streams are being designated as "catch and release" only areas.

In "catch and release" fishing, the health of the fish after the release becomes a key issue. Research studies have shown a dramatic relationship between the amount of time that a fish is handled as it is being caught and released, and its chances of survival. One study by the University of Ontario, Canada, found an astounding 68% range in mortality rates, with a direct relationship existing between the extent of fish handling, exposure to air during catch and release, and a fish's chances of survival.

There are a number of ways in which a fish's health can be compromised during the catch and release process. For example, the protective coating of slime covering the fish's body may be partially removed during handling by the fisherman, thereby leaving the unprotected areas vulnerable to waterborne infections. The delicate mouth and jaw area, as well as the gill membranes, may be damaged by the fish hook, the implement used to remove the hook, or the hands of the fisherman. The internal organs of the fish may be damaged by squeezing the fish too tightly. In addition, relatively brief exposure to air has been shown to damage gill membranes, causing delayed respiratory shock and death as much as 24 hours after the fish is released back into the water.

In order to insure the highest chances of survival for the fish, it is desirable to catch and then release the fish underwater, with as little physical contact between the fisherman and the fish as possible. It is also desirable to remove the fly from the fish without damaging the fly.

However, prior art fish hook removers do not adequately address these concerns. Typical prior art fish hook removers used by fishermen include devices designed to grab the shank, or straight part of the fish hook, with a clamping action. The fish hook and fly is then twisted, pushed, or pulled out of its engagement with the fish's mouth. A major drawback to using such a tool is that, as the hook is grabbed by the clamping type device, the delicate materials from which the fly is fabricated are often damaged. The clamping of the fly, along with the twisting and pushing forces, can tear apart the fly and render it useless. If that occurs, a new fly must be tied onto the fishing line before the fisherman can resume his pursuit.

Another drawback with these clamping type devices is that they are cumbersome to use, thereby making it difficult to grab the fly, which is often extremely small, when caught in the mouth of a live flapping fish. The fish usually must be held still, often with some force, in order to grab the fly with the clamping type device. In order to accomplish the removal of the fish hook, the fisherman typically ends up handling the fish so that the fish is immobilized during removal.

Another drawback of typical prior art fish hook removers is that, because of the difficulty in clamping onto the fish hooks, it is likely that both hands will be required to facilitate the fish hook removal. This is because a live fish usually makes a great effort to regain its freedom and is continuously moving. A typical way of landing a fish is to use a fish net, or to grab the fishing line. The fishing rod is then set aside, and both hands are used to perform the tasks of fish restraint and hook removal.

Furthermore, certain prior art fish hook removal devices appear to be designed for bait fishing purposes. An important distinction between flyfishing and baitfishing is that in flyfishing, the fish is usually hooked in the outer portion of the mouth or jaw, whereas in baitfishing, the fish is usually hooked deep in the throat. One reason for this difference may be because a fish, having taken up a hook baited with an edible material, will in most cases swallow the baited hook. On the other hand, a fish taking up an artificial fly is able to perceive the deception once the fly is in its mouth, either from the unnatural texture or the absence of the appropriate scent or taste, and immediately attempts to "spit out" the fly. This is why a flyfisherman often has only a brief instant, when the fish takes up the fly, to apply pressure to the rod and thereby "set the hook".

A hook remover designed for flyfishing therefore need not reach deep into the fish's throat to facilitate removal, whereas a hook remover designed for bait fishing must focus on removing deeply embedded hooks. Certain prior art fish hook removers are apparently designed to remove hooks from deep in the fish's throat by incorporating features that are intended to conceal the hook point, thereby preventing re-engagement as the hook is withdrawn. While necessary for deep hook removal, these design elements are not necessary for efficiently removing a fly from the outer portion of a fish's mouth.

Therefore, a better solution is needed to provide an improved fish hook remover designed specifically to address the needs of a flyfisherman fishing in a catch and release area. More specifically, a better solution is needed to eliminate or reduce damage to the fly during removal and/or the necessary handling of a fish, or use of both hands, to remove a fish hook.

SUMMARY OF THE INVENTION

The fish hook remover of the present invention enables a flyfisherman to easily engage and remove a fish hook dressed as an artificial fly from a fish using only one hand, without damaging the fly and without handling the fish, while the other hand holds onto the rod to provide tension to the fishing line. In this way, the fisherman doesn't have to handle the fish, and in a catch-and-release situation, the fisherman doesn't need to use a fishing net or remove the fish from the water.

When the fisherman catches a fish and reels the fish in, the fisherman typically holds the fishing rod in one hand, and grabs a fishing net with the other hand to land the fish. However, in a catch and release situation, the fisherman holds the fishing rod in one hand, and grabs the fish hook remover with the other hand. With the fishing rod in one hand, and the fish hook remover in the other hand, the fisherman simply reaches out with the fish hook remover and slides an elongated body portion of the fish hook remover along the fishing line, just above the fish hook, towards the fisherman. A guide region and slot on a removal tip "snags" the fishing line into a tubular head. The fisherman then slides the fish hook remover down the fishing line toward the fish hook, using the fishing line to guide the device. While the other hand holds the rod up to keep tension on the fishing line caused by the weight of the fish, the tubular head of the fish hook remover is slipped securely over the fly. Using a quick thrusting or pushing motion downward, the fish hook point is backed out of engagement with the fish's mouth or jaw. The fish hook remover is then twisted in an appropriate direction so that the fish hook does not re-hook the fish as the fish is released. Thus, in one quick thrusting and twisting motion, the fish hook and fly are removed from the fish without damaging the fly, without handling the fish, and without requiring the use of both hands to remove the fish hook.

Accordingly, it is an object of the present invention to provide an improved fish hook remover.

It is a further object of the present invention to provide a fish hook remover that minimizes damage to an artificial fly.

An additional object of the present invention is to provide a fish hook remover that enables a user to remove a fish hook from a fish without handling the fish.

Yet another object of the present invention is to provide a fish hook remover that enables a user to remove a fish hook from a fish using only one hand.

Still another object of the present invention is to insure the highest chances of survival for a fish in a catch and release situation by providing a fish hook remover that requires minimal user contact with the fish, and can be used while the fish is still in the water.

Further objects and advantages of the present invention will become apparent from a consideration of the drawings and ensuing description.

DETAILED DESCRIPTION OF A PREFERRED EMBODIMENT

Figure 1A:
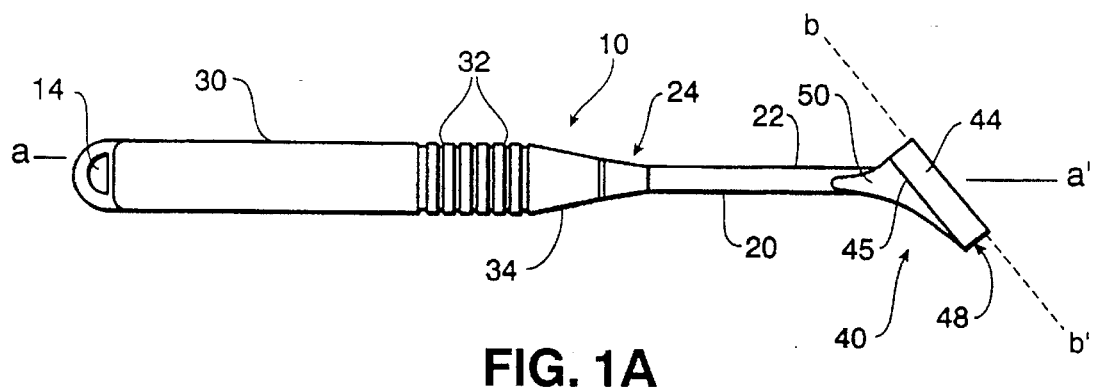
FIG. 1a is a side view of a preferred embodiment of a fish hook remover of the present invention comprising an elongated body with a removal tip on a first end and a handle on a second end. The handle comprises ridges for better grip and a flared end connecting to the second end of the elongated body.
Figure 1B:
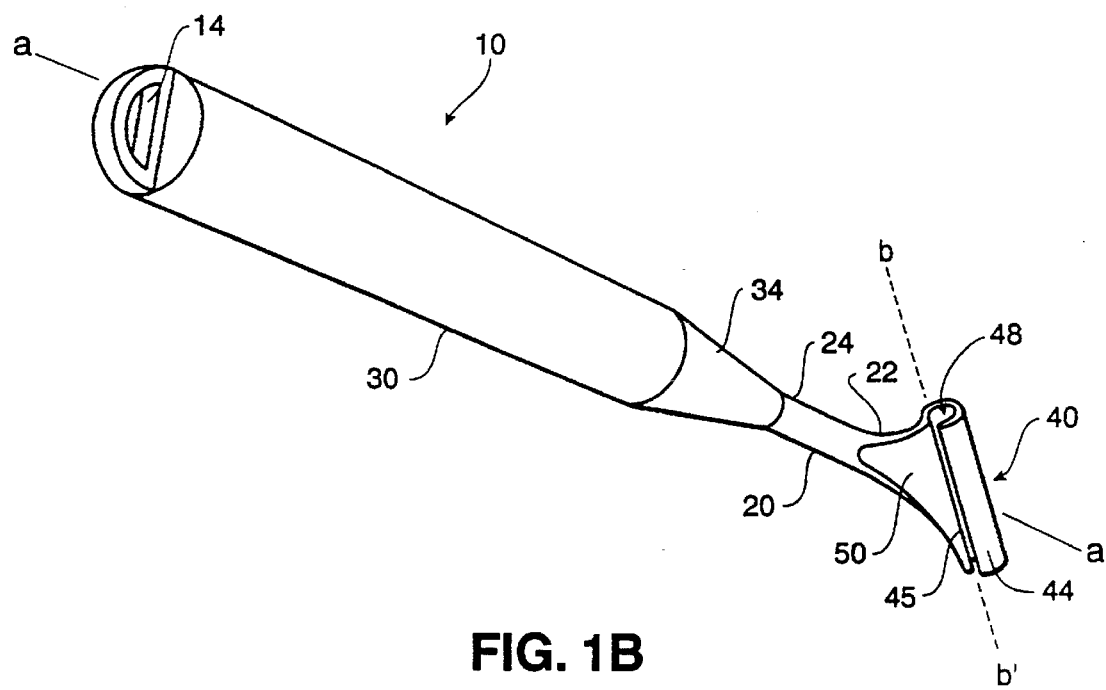
FIG. 1b is a perspective view of a preferred embodiment of a fish hook remover of the present invention viewed at an angle that shows a slot on the removal tip. As a design choice, the handle is shown without the ridges.

FIGS. 1a and 1b illustrate a side view and a perspective view of a fish hook remover 10 of the present invention, respectively. The perspective view of FIG. 1b is viewed at an angle that shows features of the fish hook remover 10 not clearly shown in the side view of FIG. 1a. The fish hook remover 10 comprises an elongated body 20 having a first end 22 and a second end 24. The relative position of the elongated body 20 defines a first axis shown as a—a'. A removal tip 40 is designed integral to the first end 22 of the elongated body 20, and a handle 30 is attached to the second end 24 of the elongated body 20. The first end 22 of the elongated body 20 is flared out such that the first end 22 is integral to the entire length of a tubular head 44. The handle 30 may include design choices such as ridges 32 on the handle for better grip (as shown in FIG. 1a) and a tapered end 34 connecting the handle 30 to the second end 24 of the elongated body 20.

In a preferred embodiment, the elongated body 20 is cylindrically shaped. It is to be understood that various other shapes may be used, and are merely design choices. The removal tip 40 comprises a guide region 50 and the tubular head 44. The position of the tubular head 44 relative to the elongated body 20 defines a second axis shown as b—b'. The angle which is formed between the axis a—a' of the elongated body 20 and the axis b—b' of the tubular head 44 is preferably larger than 0° but less than 90° measured from a to b and from a' to b'. This angle makes it easier for a fisherman to engage and remove a fish hook dressed as a fly 12 (also referred to simply as a fly) that is caught in the mouth or jaw of a fish.

Figure 4:
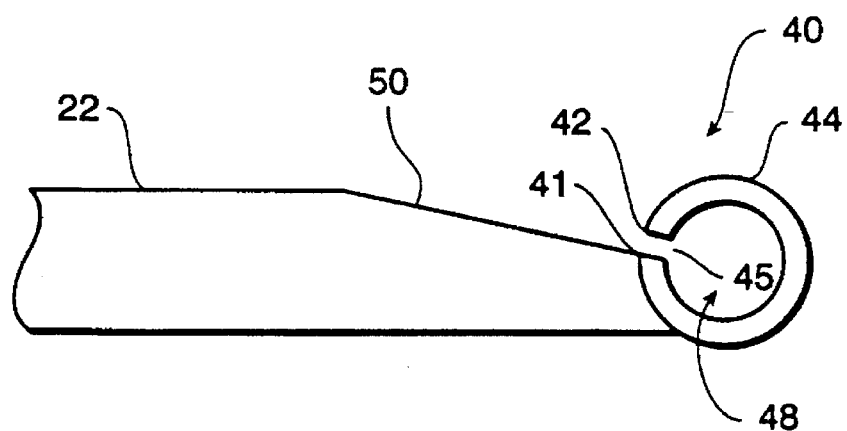
FIG. 4 is an enlarged top view of the removal tip illustrating the relationship between a guiding region, a first edge, and a second edge.

In a preferred embodiment, the tubular head 44 is shaped like a hollow cylinder, except that the tubular head 44 defines a slot 45 (as better shown in FIG. 1b) on the surface of the cylinder which prevents the tubular head 44 from forming a complete cylindrical surface. The slot 45 is defined by a first edge 41 and a second edge 42 (as shown in FIG. 4). The interior portion of the hollow tubular head 44 defines a chamber 48. It is to be understood that the tubular head 44 and chamber 48 may be manufactured in various shapes other than cylindrical, so long as the chamber 48 defined by the tubular head 44 is able to engage the fly 12 for purposes of removal, as described in further detail below.

The handle 30 may be designed in various shapes and sizes, so long as it enables a user to firmly grip the fish hook remover 10. For added convenience, the handle 30 may incorporate an opening 14 or an integral hook (not shown) which allows the fish hook remover 10 to be tied to a belt or hung in a convenient location.

Figure 3:
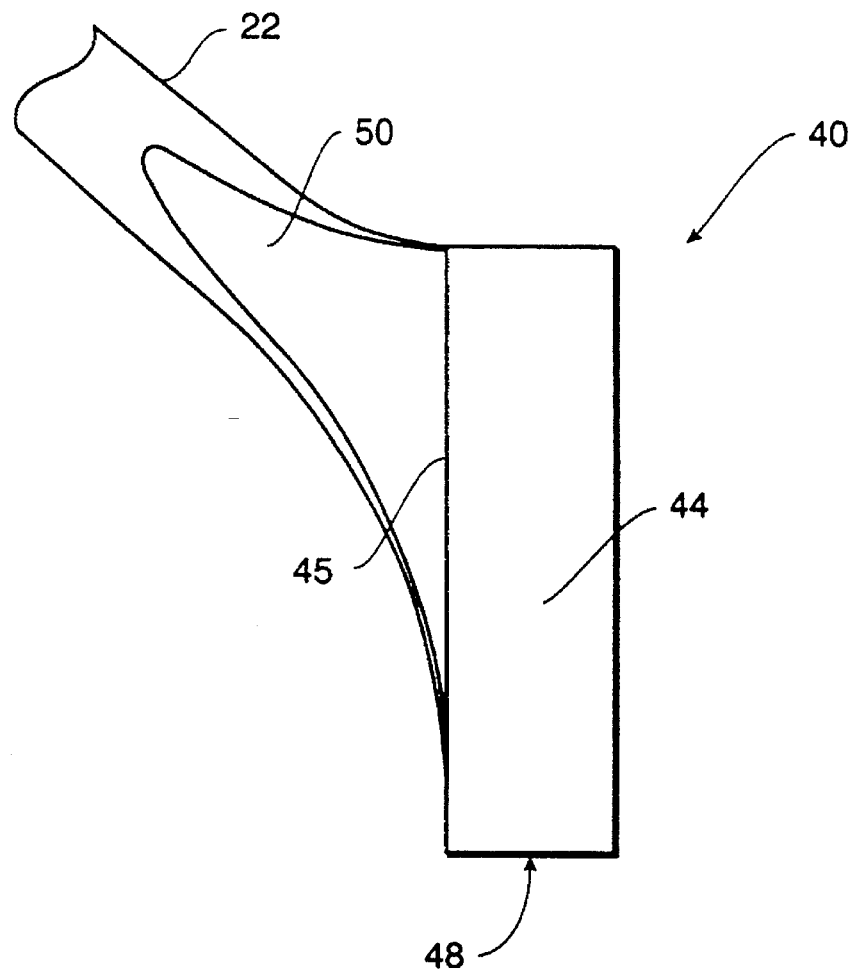
FIG. 3 is a side view of the removal tip portion of the fish hook remover which designed to engage and remove the fish hook with a thrusting and twisting motion.

The guide region 50 and the slot 45 defined by the tubular head 44 are designed so that a fishing line 11 can easily be slid into and out of the tubular head 44 chamber 48. The guide region 50 is a generally flat area that is formed between the elongated body 20 on the first end 22 and the tubular head 44. As better shown in FIGS. 3 and 4, the guide region 50 increases in surface area towards the tubular head 44 and terminates at the first edge 41 of the slot 45. The surface area of the guide region 50 increases to its maximum surface area as it terminates at the edge 41. In this way, an uninterrupted pathway is provided for the fishing line 11 to slide into the tubular head 44 chamber 48.

Figure 2:
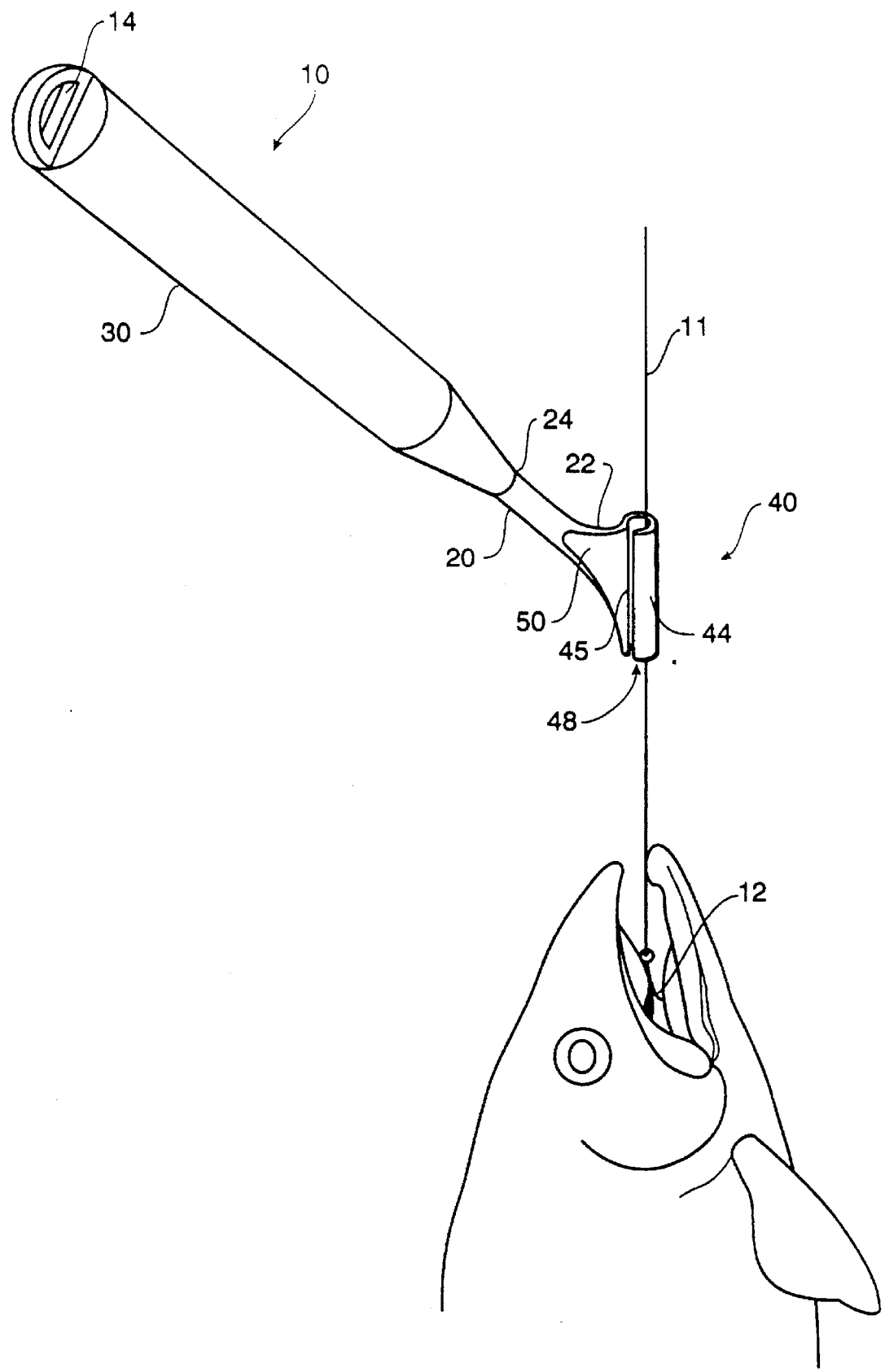
FIG. 2 is a perspective view showing the fish hook remover engaging a fishing line having a fish hooked on one end of the fishing line, thereby enabling a user to slide the fish hook remover down the fishing line to engage and remove a fish hook dressed as a fly.

FIG. 2 illustrates one of the first steps in utilizing the fish hook remover 10 of the present invention. Once a fisherman has caught a fish and reeled the fish in, the fisherman then holds the fishing rod (not shown) in one hand such that the weight of the fish keeps tension on the fishing line 11. To increase survival rates for the fish, it is preferable to keep the fish submerged under water (not shown) during removal of the fly 12. The fisherman then takes the fish hook remover 10, held in the other hand, and places the elongated body 20 against the fishing line 11 with the slot 45 facing toward the fishing line 45. The fish hook remover 10 is then slid back towards the fisherman such that the fishing line 11 slides along the guide region 50 into the tubular head 44 chamber 48. Once the fishing line 11 is slid into the tubular head 44 chamber 48, as shown in FIG. 2, the fisherman then slides the fish hook remover 10 down the fishing line 11 until the tubular head 44 chamber 48 engages the fly 12 caught in the mouth or jaw of the fish. Once the fly 12 is securely engaged by the tubular head 44, i.e., a shank portion of the fish hook dressed as a fly 12 is slid into the tubular head 44 chamber 48, the fisherman disengages and removes the fish hook 12 from the fish by applying a quick thrusting or pushing motion downward on the fly 12 to extract the fish hook point from the fish, and then twisting the fish hook remover 10 in a direction such that the point of the hook 12 does not re-hook the fish as the fish is released.

The fish hook remover 10 of the present invention enables a user to remove a fish hook dressed as a fly 12 without damaging the fly attachment since the fly is secured within the tubular head 44 chamber 48, and not clamped in a vise grip by a plier, or some other clamping type device. Since the fish hook dressed as a fly 12 is removed by simply thrusting and twisting the fish hook 12, the fisherman does not have to handle the fish. Furthermore, since the position of the fishing rod can be adjusted up or down, the fish can be kept in the water during the fish hook removal process, thereby increasing the chances of survival for the fish.

While the above description contains many specificities, these should not be construed as limitations on the scope of the invention, but rather as an exemplification of preferred embodiments thereof. Many other variations are possible. For example, the handle can be designed integral to the elongated body, or the removal tip can be designed as an attachment to the elongated body. Furthermore, the various preferred shapes and sizes of various elements are merely design choices so long as the chamber defined by the tubular head, which does not have to be cylindrical, is capable of receiving a fishing line via a slot and capable of securely engaging the fly for removal.

What is claimed is:

1. A fish hook remover comprising
   an elongated body extending along a first axis comprising a first end and a second end,
   a removal tip coupled to said first end comprising a tubular head,
   said tubular head extending along a second axis offset from said first axis, said tubular head having an axial length exceeding a transverse width of said tubular head,
   said tubular head having a surface defining a slot, and
   said tubular head having an interior defining a chamber for engaging a fish hook dressed as an artificial fly.

2. The fish hook remover of claim 1, wherein said slot extends the length of said tubular head along said second axis.

3. The fish hook remover of claim 2, wherein said chamber extends the length of said tubular head along said second axis.

4. The fish hook remover of claim 3, further comprising a handle attached to said second end.

5. The fish hook remover of claim 3, further comprising a handle integral to said second end.

6. The fish hook remover of claim 3, wherein said removal tip is integral to said first end.

7. The fish hook remover of claim 4, wherein said second axis is offset from said first axis by more than zero degrees and less than ninety degrees.

8. The fish hook remover of claim 7, wherein said removal tip further comprises a guide region positioned between said elongated body and said tubular head.

9. The fish hook remover of claim 8, wherein said guide region comprises a flat surface, said flat surface increasing in width from said elongated body towards said slot such that said flat surface extends the length of said tubular head adjacent to said slot.

10. The fish hook remover of claim 7, wherein said tubular head and said chamber are cylindrically shaped.

11. A fish hook remover comprising
    an elongated body extending along a first axis comprising a first end and a second end,
    a removal tip integral to said first end comprising a tubular head and a guide region,
    a handle attached to a second end,
    said tubular head extending along a second axis offset from said first axis by more than zero degrees and less than ninety degrees,
    said tubular head having a surface defining a slot wherein said slot extends the length of said tubular head along said second axis,
    said tubular head having an interior defining a chamber wherein said chamber extends the length of said tubular head along said second axis,
    said guide region being integral to said first end positioned between said elongated body and said tubular head, and
    said guide region comprising a flat surface, said flat surface increasing in width from said elongated body towards said slot such that said flat surface extends the length of said tubular head adjacent to said slot.

12. A method of removing a fish hook dressed as an artificial fly from a fish comprising the following steps:
    tensioning a fishing line by using the weight of a fish caught on the fishing line fish hook,
    holding a fish hook remover comprising an elongated body having a guiding region and a tubular head integral to a first end of said elongated body, and a handle attached to said second end of said elongated body, wherein said tubular head defines a slot and a chamber, said tubular head having an axial length exceeding a transverse width of said tubular head,
    sliding said elongated body along the fishing line, with said guiding region and said slot facing toward the fishing line, such that the fishing line slides toward said first end of said elongated body,
    receiving the fishing line into said chamber defined by said tubular head via the fishing line sliding across said guiding region and through said slot into said chamber,
    sliding said fish hook remover down toward the fish hook by using the fishing line as a guide for said tubular head,
    engaging the fish hook by securely sliding said tubular head over a shank portion of said fish hook such that a portion of the fish hook dressed as an artificial fly slides into said chamber of said tubular head, thereby minimizing damage to said fly, thrusting said fish hook remover downward to extract the fish hook from the fish, and twisting said fish hook remover in an appropriate direction to prevent the fish hook from re-hooking the fish as the fish is being released.

13. A fish hook remover comprising an elongated body extending along a first axis comprising a first end and a second end, a removal tip coupled to said first end comprising a tubular head and a guide region, said guide region positioned between said elongated body and said tubular head, a handle attached to said second end, said tubular head extending along a second axis offset from said first axis, said second axis offset from said first axis by more than zero degrees and less than ninety degrees, said tubular head having a surface defining a slot wherein said slot extends the length of said tubular head along said second axis, wherein said chamber extends the length of said tubular head along said second axis, said tubular head having an interior defining a chamber for engaging a fish hook dressed as an artificial fly, and said guide region comprising a flat surface, said flat surface increasing in width from said elongated body towards said slot such that said flat surface extends the length of said tubular head adjacent to said slot.

* * * * *